US009475721B2

(12) United States Patent
Yamada et al.

(10) Patent No.: US 9,475,721 B2
(45) Date of Patent: Oct. 25, 2016

(54) APPARATUS AND METHOD FOR MANUFACTURING GLASS OPTICAL ELEMENT (71) Applicant: Olympus Corporation, Tokyo (JP)

(72) Inventors: Kiyomi Yamada, Kami-Ina (JP); Takashi Watanabe, Ina (JP); Masato Nakahama, Tokyo (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 14/323,832

(22) Filed: Jul. 3, 2014

(65) Prior Publication Data

US 2014/0318183 A1 Oct. 30, 2014

Related U.S. Application Data (63) Continuation of application No. PCT/JP2013/065685, filed on Jun. 6, 2013.

(30) Foreign Application Priority Data

Jun. 18, 2012 (JP) .................................. 2012-136883

(51) Int. Cl.
C03B 11/00 (2006.01)
C03B 23/00 (2006.01)
C03B 35/00 (2006.01)

(52) U.S. Cl.
CPC .......... *C03B 11/005* (2013.01); *C03B 2215/66* (2013.01); *C03B 2215/86* (2013.01)

(58) Field of Classification Search
CPC .. C03B 5/005; C03B 2215/66; C03B 35/005
See application file for complete search history.

(56) References Cited

U.S. PATENT DOCUMENTS

| 2,840,361 A | * | 6/1958 | Hermans | C03B 25/06 432/145 |
| 5,188,652 A | * | 2/1993 | Nakamura | C03B 11/08 65/162 |
| 5,201,927 A | * | 4/1993 | Nakamura | C03B 11/08 65/111 |

(Continued)

FOREIGN PATENT DOCUMENTS

| CN | 101544462 A | 9/2009 |
| JP | S61-151028 A | 7/1986 |

(Continued)

OTHER PUBLICATIONS

International Search Report for PCT/JP2013/065685, mailing date Sep. 3, 2013.

(Continued)

*Primary Examiner* — Jason L Lazorcik
*Assistant Examiner* — Cynthia Szewczyk
(74) *Attorney, Agent, or Firm* — Arent Fox LLP (57) ABSTRACT

An apparatus for manufacturing a glass optical element includes: a heating unit that heats a glass material; a pressurizing unit that pressurizes the glass material; a cooling unit that cools the glass material; a molding room in which the heating unit, the pressurizing unit, and the cooling unit are located; an inert-gas supplying unit that forms a plurality of flows of an inert gas within the molding room by blowing the inert gas in a plurality of directions crossing each other; and an inert-gas emitting unit that emits, from within the molding room, the inert gas supplied into the molding room by the inert-gas supplying unit.

19 Claims, 9 Drawing Sheets

(56) References Cited

U.S. PATENT DOCUMENTS

| | | | |
|---|---|---|---|
| 5,616,161 A | 4/1997 | Morikita | |
| 6,003,339 A | 12/1999 | Morikita | |
| 2008/0224348 A1* | 9/2008 | Ohgami | C03B 11/005 264/238 |
| 2008/0282737 A1* | 11/2008 | Ohgami | C03B 11/005 65/157 |
| 2012/0024011 A1* | 2/2012 | Shibuki | C03B 11/122 65/25.1 |

FOREIGN PATENT DOCUMENTS

| | | |
|---|---|---|
| JP | H06-048748 A | 2/1994 |
| JP | H06-219753 A | 8/1994 |
| JP | 2006-143546 A | 6/2006 |
| JP | 2008-120645 A | 5/2008 |
| JP | 2008-297156 A | 12/2008 |
| JP | 2009-096676 A | 5/2009 |

OTHER PUBLICATIONS

Notice of Rejection Grounds mailed on Feb. 2, 2016 for corresponding JP application No. 2012-136883 with partial translation.
Chinese Office Action mailed Sep. 6, 2015 for Chinese application No. 201380004828.8 (english translation attached).

* cited by examiner

APPARATUS AND METHOD FOR MANUFACTURING GLASS OPTICAL ELEMENT

CROSS REFERENCE TO RELATED APPLICATIONS

This is Continuation application of PCT application No. PCT/JP/2013/065685, filed Jun. 6, 2013 which was not published under PCT Article 21(2) in English.

This application is based upon and claims the benefit of priority from the prior Japanese Patent Application No. 2012-136883, filed Jun. 18, 2012, the entire contents of which are incorporated herein by reference.

BACKGROUND OF THE INVENTION

1. Field of the Invention

The present invention relates to an apparatus and a method for manufacturing glass optical elements such as lenses, prisms, and mirrors.

2. Description of the Related Art

Conventionally, a method for manufacturing a glass optical element has been known wherein, in a molding room, a glass material is softened via heating, molded via pressurization, and solidified via cooling. It is known that, in the manufacturing of a glass optical element, a manufacturing apparatus is used that transports a mold set for accommodating a glass material to a heating stage, a pressurizing stage, and a cooling stage. It is also known that a manufacturing apparatus is used that transports a glass material to a space between a pair of molds located within an apparatus, where the glass material is heated, pressurized, and cooled.

For the aforementioned methods for manufacturing a glass optical element, a method is known for supplying an inert gas into a molding room to prevent deterioration that would be caused by oxidation of, for example, a mold set (see, for example, patent documents 1-5).

Methods for supplying an inert gas into a molding room include: a method wherein a new inert gas is always supplied into the molding room (i.e., inert gases are not circulated for reuse); and a method wherein an inert gas is circulated within a molding room and a catalyst chamber and is then supplied into the molding room.

Patent Document 1: Japanese Laid-open Patent Publication No. 2008-297156
Patent Document 2: Japanese Laid-open Patent Publication No. 2009-96676
Patent Document 3: Japanese Laid-open Patent Publication No. 2008-120645
Patent Document 4: Japanese Laid-open Patent Publication No. 2006-143546
Patent Document 5: Japanese Laid-open Patent Publication No. 61-151028

SUMMARY OF THE INVENTION

In one aspect, an apparatus for manufacturing a glass optical element includes: a heating unit that heats a glass material; a pressurizing unit that pressurizes the glass material; a cooling unit that cools the glass material; a molding room in which the heating unit, the pressurizing unit, and the cooling unit are located; an inert-gas supplying unit that forms a plurality of flows of an inert gas within the molding room by blowing the inert gas in a plurality of directions that cross each other; and an inert-gas emitting unit that emits, from within the molding room, the inert gas supplied into the molding room by the inert-gas supplying unit.

In another aspect, a method for manufacturing a glass optical element includes heating, pressurizing, and cooling a glass material within a molding room, the method further including: forming a plurality of flows of an inert gas within the molding room by blowing the inert gas in a plurality of directions that cross each other; and emitting, from within the molding room, the inert gas introduced into the molding room.

DESCRIPTION OF THE PREFERRED EMBODIMENT

In both a situation where a new inert gas is always supplied into a molding room and a situation where an inert gas is circulated within a molding room and a catalyst chamber and is then supplied into the molding room, a large quantity of inert gas is needed to decrease an oxygen concentration in the molding room.

An increase in the supply of an inert gas increases the cost of the inert gas and, ultimately, the cost to manufacture glass optical elements. In the case of using a catalyst chamber, an increase in the supply (=amount of circulation) of an inert gas increases the burden of performing maintenance, e.g., replacement of a catalyst. This means that the cost of manufacture increases not only in a situation where a new inert gas is always supplied into a molding room but also in a situation where a catalyst chamber is used.

With reference to the drawings, the following will describe an apparatus and a method for manufacturing a glass optical element in accordance with an embodiment of the invention.

Figure 1:
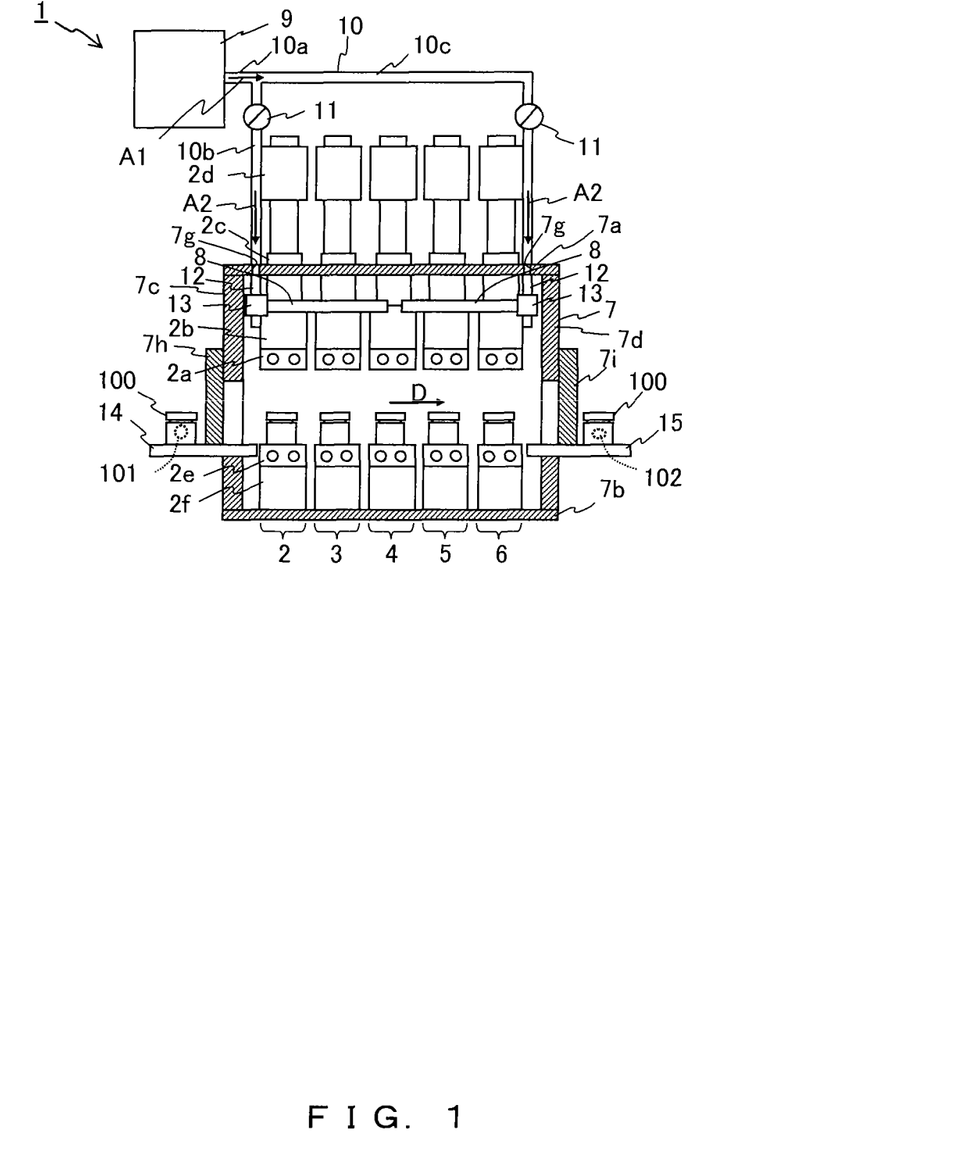
FIG. 1 is a cross sectional view of an apparatus for manufacturing a glass optical element in accordance with an embodiment of the invention, wherein the apparatus is seen from the back.
Figure 2:
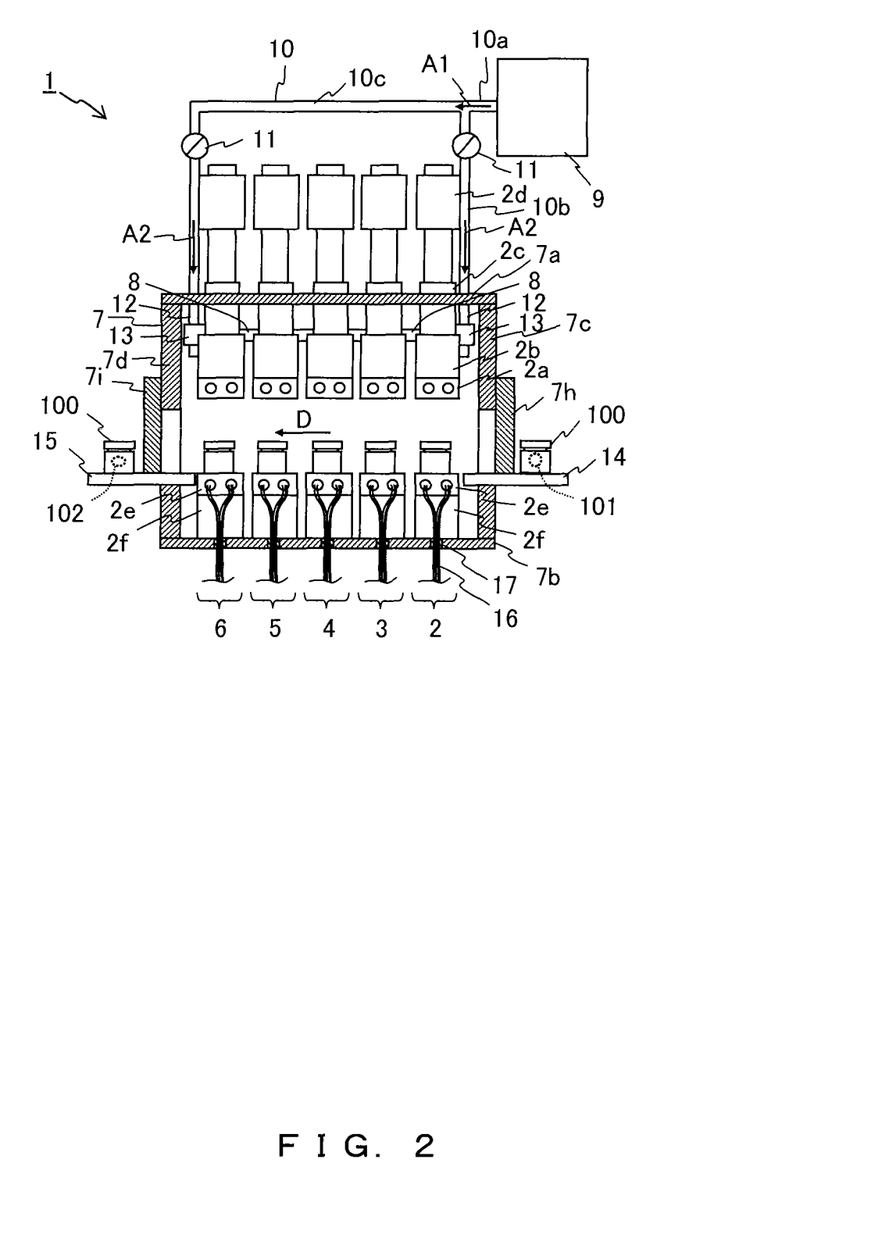
FIG. 2 is a cross sectional view of an apparatus for manufacturing a glass optical element in accordance with an embodiment of the invention, wherein the apparatus is seen from the front.

FIGS. 1 and 2 are cross-sectional views of a glass-optical-element manufacturing apparatus 1 in accordance with an embodiment of the invention, wherein the apparatuses are seen from the back and the front respectively in FIGS. 1 and 2.

The glass-optical-element manufacturing apparatus 1 depicted in FIGS. 1 and 2 includes: a first heating stage 2 and a second heating stage 3; a pressurizing stage 4; a first cooling stage 5 and a second cooling stage 6; a molding room 7; inert-gas supplying units 8; and gas emission caps 17. The first heating stage 2 and the second heating stage 3 are exemplary heating units that heat a glass material 101. The pressurizing stage 4 is an exemplary pressurizing unit that heats the glass material 101. The first cooling stage 5 and the second cooling stage 6 are exemplary cooling units that cool the glass material 101. The gas emission caps 17 are exemplary inert-gas emitting units.

The glass-optical-element manufacturing apparatus 1 also includes an inert-gas supply source 9, inert-gas supply passages 10, flow rate adjustors 11, swivel shafts 12, swivel blocks 13, a mold insertion stand 14, a mold ejection stand 15, heater lines 16, a wind deflection member 18, and a hinge member 19.

The first heating stage 2, the second heating stage 3, the pressurizing stage 4, the first cooling stage 5, and the second cooling stage 6 are arranged in this order within the molding room 7 in a direction in which a mold set 100 that accommodates the glass material 101 is transported (hereinafter referred to as "the transportation direction D of the mold set 100").

The embodiment includes two heating stages, one pressurizing stage, and two cooling stages; however, when, for example, the total number of stages is nine, there may be three heating stages, two pressurizing stages, and four cooling stages. For each type of stage, the number of stages may be properly determined in accordance with, for example, the total number of stages and the type of a glass optical element 102 to be manufactured. The total number of stages may be one or larger because a single stage may serve as two or all of the heating unit, the pressurizing unit, and the cooling unit.

The mold set 100 in accordance with the embodiment includes, for example, an upper mold and a lower mold, facing each other, and a sleeve therearound. However, as long as the mold set 100 can accommodate the glass material 101, the mold set 100 may have any configuration.

In the embodiment, the mold set 100 is transported within the molding room 7. However, the mold set 100 may be omitted when a manufacturing apparatus is used that heats, pressurizes, and cools a glass material between a pair of molds fixed within the molding room 7.

The first heating stage 2 includes an upper heater block 2a, an upper heat-insulation block 2b, a press shaft 2c, a cylinder 2d, a lower heater block 2e, and a lower heat-insulation block 2f.

The upper heater block 2a, into which, for example, a cartridge heater is inserted, abuts a top surface of the mold set 100 to heat the mold set 100 through thermal conduction.

The upper heat-insulation block 2b is placed on an upper portion of the upper heater block 2a.

The press shaft 2c includes a bottom end coupled to a center of the top surface of the upper heat-insulation block 2b.

The cylinder 2d, which is connected to the press shaft 2c, moves up or down the upper heater block 2a, the upper heat-insulation block 2b, and the press shaft 2c.

The lower heater block 2e faces the upper heater block 2a, and the mold set 100 is placed on an upper surface of the lower heater block 2e. The lower heater block 2e, into which, for example, a cartridge heater is inserted, abuts a bottom surface of the mold set 100 to heat the mold set 100 through thermal conduction.

The lower heat-insulation block 2f is located below the lower heater block 2e and is fixed on a bottom plate 7b of the molding room 7.

As with the first heating stage 2, the second heating stage 3, the pressurizing stage 4, the first cooling stage 5, and the second cooling stage 6 include a heater block (2a), an upper heat-insulation block (2b), a press shaft (2c), a cylinder (2d), a lower heater block (2e), and a lower heat-insulation block (2f), and hence descriptions thereof are omitted herein.

The molding room 7 includes a top plate 7a, the bottom plate 7b, a right-side plate 7c, a left-side plate 7d, a front plate 7e, a back plate 7f, an inert-gas introduction port 7g (e.g., two inert-gas introduction ports 7g), a mold insertion port shutter 7h, and a mold ejection port shutter 7i.

The molding room 7 includes an external wall formed of the six plates: the top plate 7a, the bottom plate 7b, the right-side plate 7c, the left-side plate 7d, the front plate 7e, and the back plate 7f. The molding room 7 assumes, for example, the shape of a rectangular solid. The front plate 7e and the back plate 7f are, for example, doors.

As depicted in FIG. 1, the inert-gas introduction port 7g is, for example, a through bore or a tube for introduction of an inert gas A2 from the inert-gas supply passages 10 into the molding room 7.

The mold insertion port shutter 7h, which is provided at the right-side plate 7c (located at the left-hand side of the molding room 7 in FIG. 1, i.e., a view seen from the back), opens while the mold set 100 is being inserted from the mold insertion stand 14, which will be described hereinafter, into the molding room 7.

The mold ejection port shutter 7i, which is provided at the left-side plate 7d, opens while the mold set 100 is being ejected from the molding room 7 onto the mold ejection stand 15, which will be described hereinafter.

The inert-gas supply source 9 supplies an inert gas A, e.g., nitrogen or argon (an inert gas A that has been supplied shortly before will hereinafter be referred to as an "inert gas A1").

The inert-gas supply passages 10 include a first supply passage 10a, a second supply passage 10b, and a third supply passage 10c.

The first supply passage 10a is coupled to the inert-gas supply source 9. The inert-gas supply source 9 supplies an inert gas A1 to the first supply passage 10a.

The second supply passage 10b and the third supply passage 10c divide the inert gas A supplied from the first supply passage 10a into two paths. The dividing is intended to introduce the inert gas A2 through the two inert-gas introduction ports 7g of the molding room 7; accordingly, the dividing is not needed when the inert gas A is introduced into the molding room 7 through only one inert-gas introduction port 7g.

An inert gas may be introduced through three or more inert-gas introduction ports 7g into the molding room 7 by dividing an inert gas A1 into three or more paths. Needless to say, a plurality of inert-gas supply sources 9 may be disposed without a gas being divided.

The second supply passage 10b and the third supply passage 10c each have located therein the flow rate adjustor 11, which adjusts the flow rate of an inert gas A2. The flow rate adjustor 11 may consist of a throttle valve only, or may include, for example, a flow-rate displaying unit and an adjustment operation unit in addition to the throttle valve.

The two swivel shafts 12 each include an upper end coupled to a lower end of an inert-gas introduction port 7g. The swivel shafts 12 have formed therein a flow passage through which an inert gas A2 flows.

The two swivel blocks 13 are each coupled to a lower end of a swivel shaft 12. The swivel blocks have formed therein a flow passage through which an inert gas A2 flows.

One end of the inert-gas supplying unit 8 is coupled to the swivel block 13.

Accordingly, the inert-gas supplying unit 8 is pivotable about two pivot axes: an axis in a longitudinal direction (axial direction) of the swivel shaft 12, and an axis in a longitudinal direction (axial direction) of the inert-gas supplying unit 8. Thus, the orientation of the inert-gas supplying unit 8 and, ultimately, the orientation of an inert gas A2 (this will be described hereinafter) are adjustable with respect to the two axes.

The inert-gas supplying unit 8 is, for example, a pipe assuming a tube shape such as a cylindrical shape. On the back-face side of each of the stages 2-6, the inert-gas supplying unit 8 is located near the top plate 7a in a manner such that a longitudinal direction (axial direction) of the inert-gas supplying unit 8 extends in parallel with the transportation direction D of the mold set 100. Hence, two inert-gas supplying units 8 are located at the backs of all of the stages 2-6.

Figure 3:
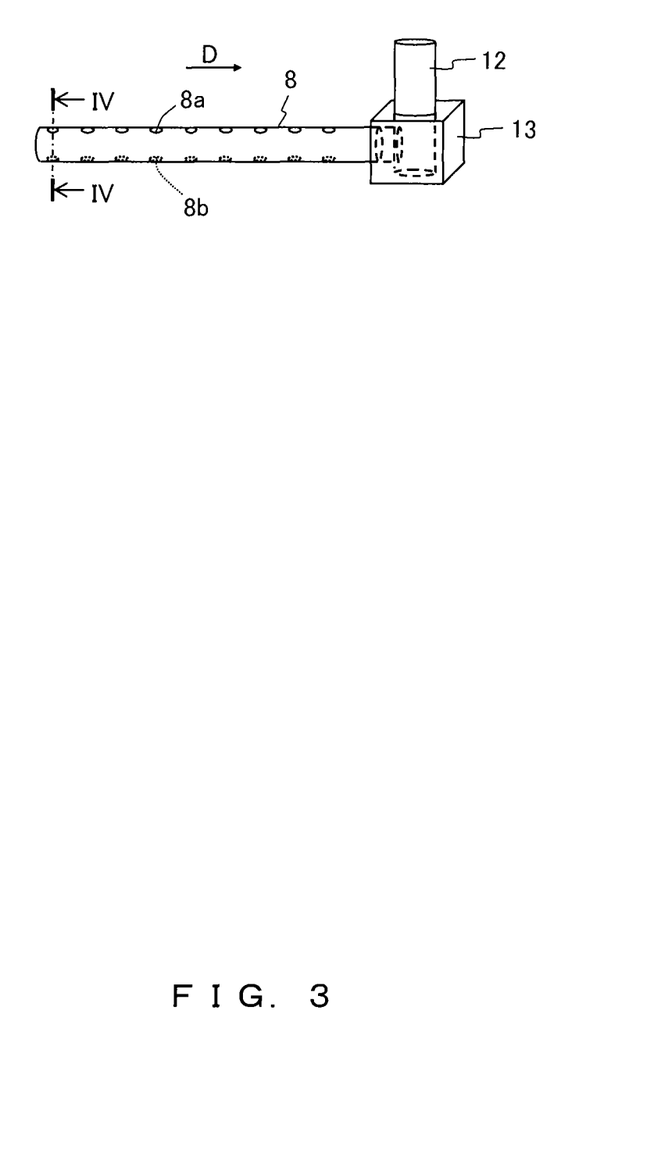
FIG. 3 is a perspective view illustrating an inert-gas supplying unit and other elements of an embodiment of the invention.
Figure 4:
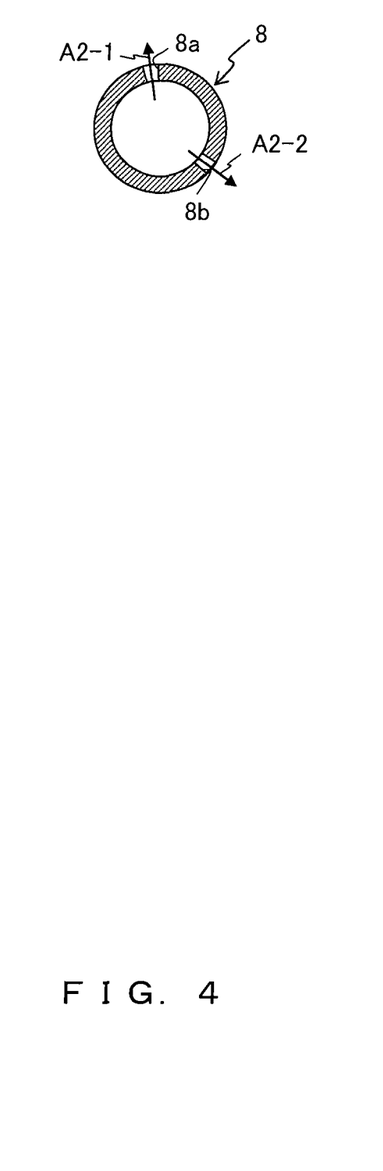
FIG. 4 is a cross-sectional view taken on line IV-IV of FIG. 3.

As depicted in FIGS. 3 and 4, the inert-gas supplying unit 8 includes a plurality of first gas blowing ports 8a and a plurality of second gas blowing ports 8b.

The first gas blowing ports 8a, i.e., through bores arranged in the transportation direction D of the mold set 100, blow inert gases A2-1.

The second gas blowing ports 8b, which are also through bores arranged in the transportation direction D of the mold set 100, blow inert gases A2-2 in a direction that is different, by 90° or greater, from a direction in which the first gas blowing ports 8a blow gases. In this manner, the first gas blowing ports 8a and the second gas blowing ports 8b blow inert gases A2-1 and A2-2 in directions crossing each other. This forms a plurality of flows of the inert gases A2-1 and A2-2 within the molding room 7.

Accordingly, as will be described in detail hereinafter, the inert gas A2-1 blown by the first gas blowing ports 8a flows along the top plate 7a and the front plate 7e to the gas emission caps 17, and the inert gas A2-2 blown by the second gas blowing ports 8b flows along the back plate 7f and the bottom plate 7b to the gas emission caps 17.

In the embodiment, the orientation of the first gas blowing ports 8a of the inert-gas supplying unit 8 is different from the orientation of the second gas blowing ports 8b by 90° or greater. However, as long as the inert-gas supplying unit 8 can form, as described above, a plurality of flows to send the inert gases A2-1 and A2-2 to the gas emission caps 17, the positions of the plurality of gas blowing ports 8a and 8b are not limited.

First gas blowing ports 8a and second gas blowing ports 8b located farther from the swivel block 13, i.e., a fixed end of the inert-gas supplying unit 8, or located closer to a free end, may have a wider opening space (cross-section area of flow passage), so that equal amounts of gas can be blown from the ports closer to the fixed end and the ports closer to the free end.

A gas blowing port may be further provided that blows an inert gas A2 in a direction that crosses both the inert gas A2-1 blown by the first gas blowing ports 8a and the inert gas A2-2 blown by the second gas blowing ports 8b. Note that there may be any number of first gas blowing ports 8a and second gas blowing ports 8b; there may be one first gas blowing port 8a and one second gas blowing port 8b.

A mold set 100 just before insertion into the molding room 7 is placed on the mold insertion stand 14.

A mold set 100 just after ejection from the molding room 7 is placed on the mold ejection stand 15.

The heater lines 16 are connected to the lower heater blocks 2e of the first heating stage 2, the second heating stage 3, the pressurizing stage 4, the first cooling stage 5, and the second cooling stage 6.

Figure 5:
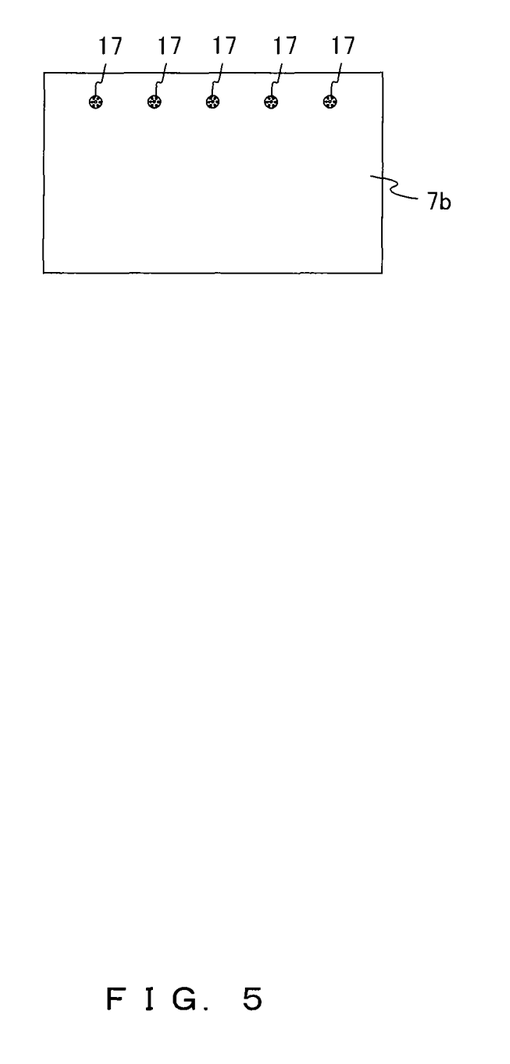
FIG. 5 is a bottom view illustrating a bottom plate of a molding room of an embodiment of the invention.

In the embodiment, as many gas emission caps 17 (FIG. 6) as the number of stages 2-6 are provided at the bottom plate 7b as depicted in FIG. 5. The gas emission gap 17 assumes a pillar shape, e.g., column shape.

Figure 6:
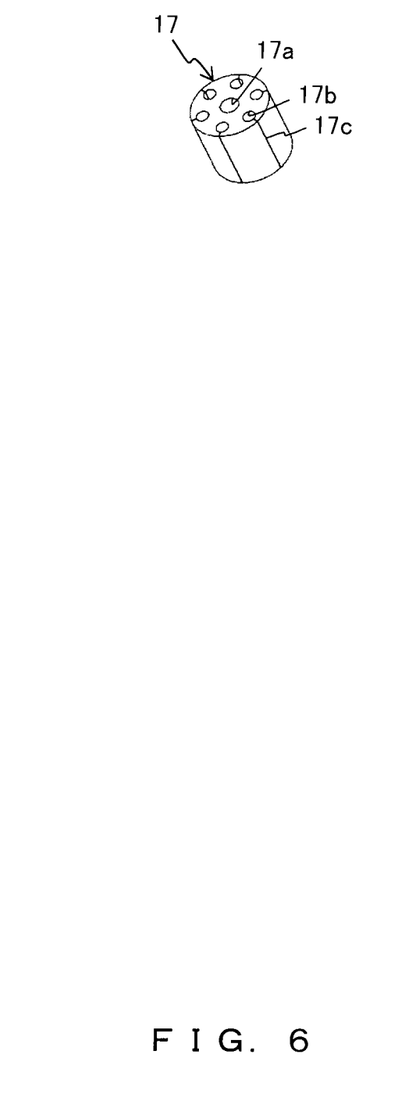
FIG. 6 is a perspective view illustrating a gas emission cap of an embodiment of the invention.

A gas emission port 17a is formed at, for example, a center of the gas emission cap 17. Heater line introduction ports 17b, e.g., five ports, are formed around the gas emission port 17a, wherein the heater lines 16 connected to the heater blocks 2a of the stages 2-6 are inserted through the heater line introduction ports 17b. The gas emission cap 17 may have a slit 17c formed therein such that the heater line 16 can be inserted through a peripheral surface of the gas emission cap 17 into the heater line introduction port 17b and can be removed therefrom.

The gas emission cap 17 functions as an inert-gas emitting unit to allow the gas emission port 17a to emit inert gases A2 and A3 from within the molding room 7.

In the embodiment, the inert gas A supplied by the inert-gas supply source 9 and then emitted from the gas emission cap 17 is not reused; however, oxygen may be removed from the gas emitted from the gas emission cap 17 using, for example, a catalyst, and then the gas may be circulated and again introduced through the inert-gas introduction port 7g into the molding room 7.

Figure 7:
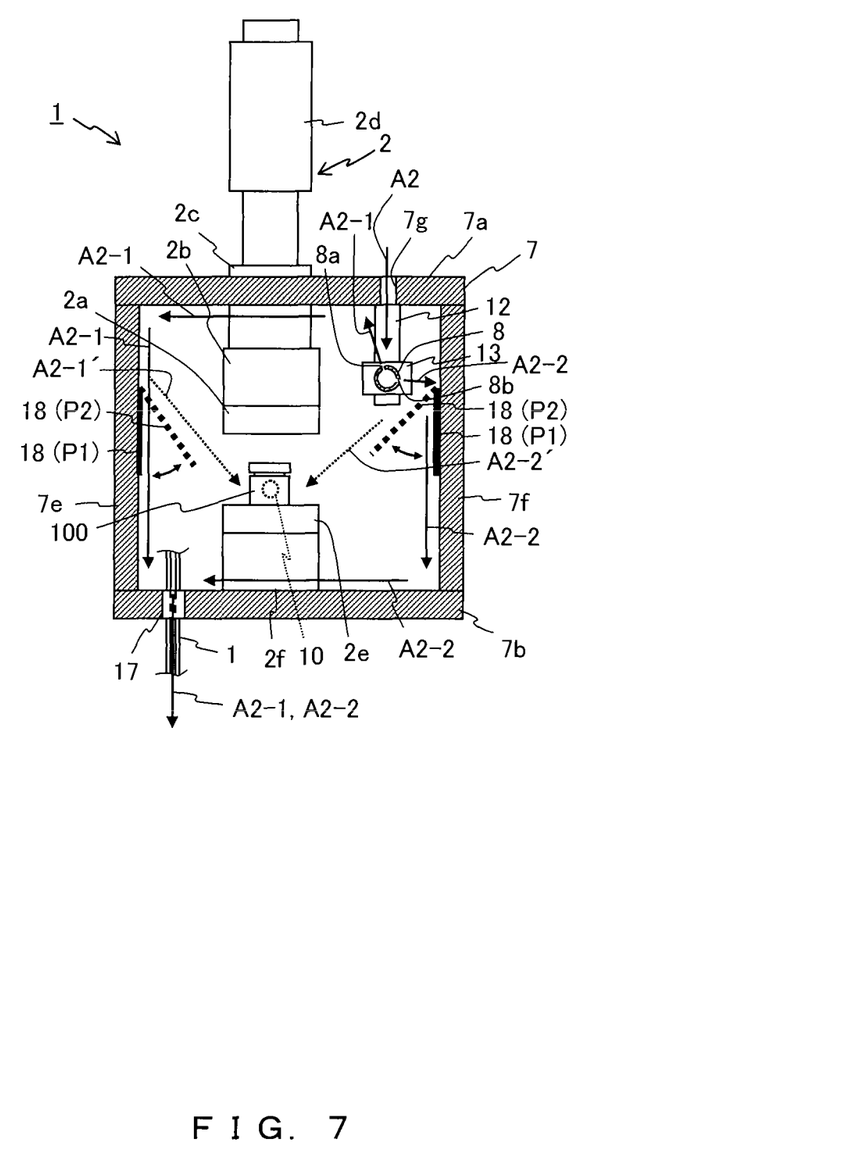
FIG. 7 is a cross-sectional view of an apparatus for manufacturing a glass optical element in accordance with an embodiment of the invention, wherein the apparatus is seen from the right.
Figure 8:
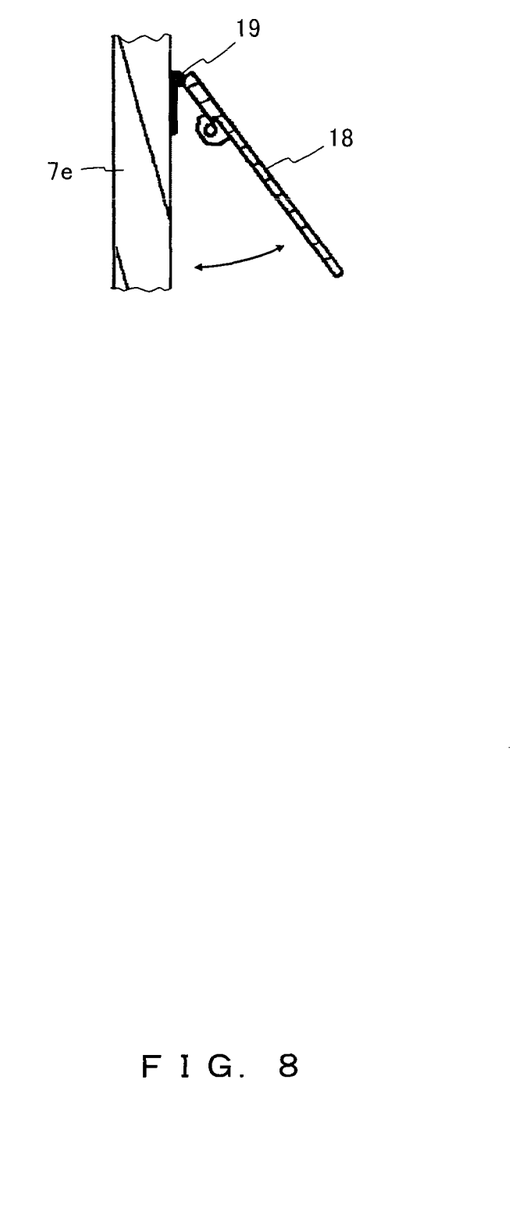
FIG. 8 is a side view illustrating a wind deflection member in accordance with an embodiment of the invention.
Figure 9:
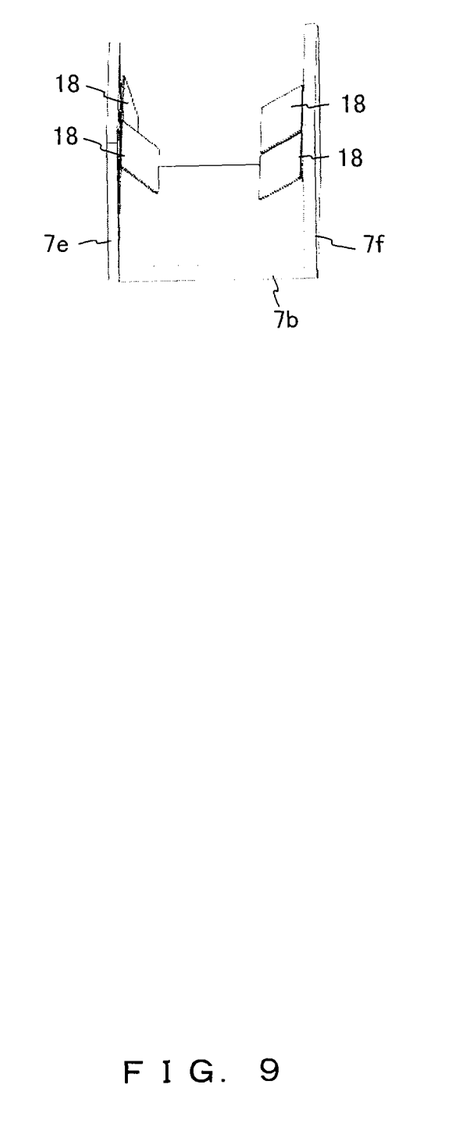
FIG. 9 is a perspective view illustrating wind deflection members and other elements of an embodiment of the invention.

As illustrated in FIGS. 7-9, the wind deflection members 18 are located on the front plate 7e and the back plate 7f of the molding room 7 and assume, for example, a tubular shape or a block shape. A material for the wind deflection members 18 may be, but is not limited to, a heat-resistant material such as SUS.

The hinge members 19 provided on the front plate 7e and the back plate 7f support the wind deflection members 18 pivotably about the upper ends. A driving source (not illustrated) pivots the wind deflection members 18 to positions where these members deflect the flows of inert gases A2-1 and A2-2 formed by the inert-gas supplying unit 8 toward the mold set 100 (A2-1', A2-2') (P2), and to positions where these members do not deflect the flow, namely, positions retracted from the former positions (P1) (exemplary movement).

Two wind deflection members 18 are located at each of the two plates, the front plate 7e and the back plate 7f; however, the number of wind deflection members located at each of the two plates is not limited, e.g., one wind deflection member may be provided for each of the plates, or as many wind deflection members as the number of stages may be provided for each of the plates.

Depending on the flow of an inert gas, a wind deflection member 18 may be located at only the front plate 7e or may be located at only the back plate 7f. In addition, as long as the wind deflection member 18 is within the molding room 7, the wind deflection member 18 may be located at, for example, the top plate 7a or the bottom plate 7b. In addition, the wind deflection member 18 may be fixed in a deflecting position (P2).

The following will describe a method for manufacturing the glass optical element 102 in accordance with the embodiment. Note that descriptions of the matters already described above are omitted herein.

Controlling means (not illustrated) sets the temperatures of the upper heater blocks 2a and the lower heater blocks 2e of the first heating stage 2, the second heating stage 3, the pressurizing stage 4, the first cooling stage 5, and the second cooling stage 6, all depicted in FIGS. 1 and 2, to correct temperatures, and maintains those temperatures.

The inert-gas supply source 9 supplies an inert gas A1 to the inert-gas supply passages 10, which divide the inert gas A1 into two gases (inert gases A2).

The inert gases A2 introduced through the inert-gas introduction ports 7g into the molding room 7 are supplied via the swivel shafts 12 and the swivel blocks 13 to the inert-gas supplying units 8.

The inert-gas supplying units 8 blow the inert gases A2 from the first gas blowing ports 8a and the second gas blowing ports 8b in a plurality of directions crossing each other, thereby forming a plurality of flows of inert gases A2-1 and A2-2 within the molding room 7, as depicted in FIG. 7 (inert-gas supplying step).

In the embodiment, the inert gases A2-1 blown from the first gas blowing ports 8a flow toward the front plate 7e along the top plate 7a, then flow toward the bottom plate 7b along the front plate 7e, and are finally emitted from the gas emission ports 17a of the gas emission caps 17.

The inert gases A2-2 blown from the second gas blowing ports 8b flow toward the bottom plate 7b along the back plate 7f, then flow toward the front plate 7e along the bottom plate 7b, and are finally emitted from the gas emission ports 17a of the gas emission caps 17.

The inert gases A2-1 and A2-2 are emitted from within the molding room 7 through the gas emission ports 17a of the gas emission caps 17 (inert-gas emitting step). The inert gases A2-1 and A2-2 emitted in the inert-gas emitting step may include, in the strict sense, oxygen generated within the molding room 7, but an object to be emitted herein will also be referred to as an "inert gas".

A transportation robot (not illustrated) transports the mold set 100 accommodating the glass material 101 onto the mold insertion stand 14. Then, the mold insertion port shutter 7h opens to let the mold set 100 be inserted into the molding room 7.

The mold set 100 inserted into the molding room 7 is placed on the lower heater block 2e of the first heating stage 2. Then, the cylinder 2d lowers the press shaft 2c, and the mold set 100 and the glass material 101 accommodated therein are heated by thermal conduction from the upper heater block 2a and the lower heater block 2e (heating step).

Transportation means (not illustrated) transports the mold set 100 heated at the first heating stage 2 to the second heating stage 3, where the mold set 100 is heated in a similar manner to the way that it is heated at the first heating stage 2. Through the heating, the glass material 101 within the mold set 100 is softened (heating step).

Next, the mold set 100 is transported to the pressurizing stage 4, where the glass material 101 is pressurized until the glass material 101 has a predetermined thickness (pressurizing step). After the glass material 101 is pressurized, the mold set 100 is transported to the first cooling stage 5 and then to the second cooling stage 6, thereby cooling the glass material 101 (cooling step). Consequently, the glass material 101 is solidified.

After the heating step, the pressurizing step, and the cooling step are completed within the molding room 7, i.e., after the cooling at the second cooling stage 6, the mold ejection port shutter 7i opens, and the mold set 100 is ejected from the molding room 7 onto the mold ejection stand 15. Subsequently, the glass optical element 102 is taken out of the mold set 100.

In the glass-optical-element manufacturing apparatus 1, mold sets 100 such as those described above are sequentially inserted into and ejected from the molding room 7, and glass optical elements 102 are successively manufactured within the molding room 7.

In the above-described embodiment, the inert-gas supplying units 8 blow the inert gases A2 in a plurality of directions crossing each other, thereby forming a plurality of flows of the inert gases A2 (inert gases A2-1 and A2-2) within the molding room 7. The inert-gas emitting unit (gas emission cap 17) emits the inert gases A2-1 and A2-2 from within the molding room 7.

Accordingly, replacement of gas within the molding room 7 can be done smoothly. Hence, in comparison with a situation in which an inert gas is supplied in one direction or is diffused within the molding room 7, gas replacement can be done using a small amount of inert gas A, thereby maintaining a low oxygen concentration.

Therefore, the embodiment may suppress the supply of the inert gas A so as to decrease the oxygen concentration within the molding room 7.

In addition, without using, for example, a catalyst to circulate the inert gas A, the inert-gas supplying units 8 can suppress the supply of the inert gas A supplied by the inert-gas supply source 9, thereby preventing an increase in oxygen concentration and the burden of performing maintenance, both of which would be caused by deterioration of a catalyst in the case of using a configuration for circulation of the inert gas A. However, as described above, the inert-gas supplying units 8 may supply a circulated inert gas A into the molding room 7. Also, in this case, an increase in oxygen concentration can be suppressed, and the burden of performing maintenance can be decreased.

In addition, the inert-gas supplying units 8 may be located at a place distant from the mold set 100, thereby preventing an occurrence of temperature distribution on the mold set 100.

In the embodiment, the wind deflection members 18 deflect the flows A2-1 and A2-1 of the inert gas A formed by the inert-gas supplying units 8 toward the mold set 100. Hence, the inert gas can be concentrated on the mold set 100, thereby suppressing deterioration of the mold set 100.

In the embodiment, the wind deflection members 18 move to positions where the wind deflection members 18 deflect the flows A2-1 and A2-2 of the inert gas A formed by the inert-gas supplying units 8 toward the mold set 100 (P2), and to positions where the wind deflection members 18 do not deflect the flows A2-1 and A2-1, namely, positions retracted from the former positions (P1). Hence, the inert gas may be concentrated on the mold set 100 on an as-needed basis.

In the embodiment, the inert-gas supplying unit 8 includes a plurality of first gas blowing ports 8a arranged in the transportation direction D of the mold set 100 and that blow an inert gas A2-1, and a plurality of second gas blowing ports 8b arranged in the transportation direction D of the mold set 100 and that blow an inert gas A2-2 in a direction crossing the direction in which the first gas blowing ports 8a blow the inert gas A2-1. Accordingly, since the inert gases A2-1 and A2-2 can be blown along the transportation direction D of the mold set 100, the oxygen concentration within the molding room 7 can be decreased using a simple configuration.

In the embodiment, the orientation of the plurality of gas blowing ports 8a of the inert-gas supplying unit 8 is different from the orientation of the plurality of second gas blowing ports 8b by 90° or greater. Accordingly, replacement of gas within the molding room 7 can be done more smoothly.

In the embodiment, the gas emission caps 17 emit inert gases A2-1 and A2-2 from within the molding room 7 and form the introduction ports 17b of the heater lines 16. Hence, the inert gases A2-1 and A2-2 can be emitted from within the molding room 7 using a simple configuration.

In the embodiment, the gas emission cap 17 includes the gas emission port 17a and the heater line introduction ports 17b provided independently from the gas emission port 17a. This ensures emission of the inert gases A2-1 and A2-2 while preventing a backflow of gas through the heater line introduction ports 17b. Hence, the inert gases A2-1 and A2-2 can be emitted from within the molding room 7 using a simpler configuration.

What is claimed is:

1. An apparatus for manufacturing a glass optical element, the apparatus comprising:
   a molding room having front and back plates facing one another;
   means for sequentially heating, pressurizing and cooling a glass material located in a mold set as the mold set moves along a transportation path in the molding room;
   an elongated inert gas supply conduit located in the molding room and having a longitudinal axis extending parallel to the transportation path, the inert gas supply conduit having outlets for releasing inert gas into the molding room in a plurality of directions which cross one another at different points along the transportation path; and
   a deflector that deflects at least some of the inert gas released by the outlets towards the mold set, the deflector being located on at least one of the front and back plates of the molding room.

2. The apparatus of claim 1, wherein the means comprises a heating unit that heats the glass material, a pressurizing unit that pressurizes the glass material and a cooling unit that cools the glass material.

3. The apparatus of claim 1, further including a gas supply passage for supplying the inert gas to the inert gas supply conduit.

4. The apparatus of claim 1, further including an inert gas emitting unit that allows the inert gas to exit the molding room.

5. The apparatus of claim 4, wherein the inert gas emitting unit comprises at least one opening extending to a location external to the molding room.

6. The apparatus of claim 4, wherein the inert gas emitting unit includes an introduction port of a heater.

7. The apparatus of claim 6, wherein the inert gas emitting unit further includes a gas emission port provided independently from the introduction port of the heater.

8. The apparatus of claim 1, wherein the inert gas supply conduit has first and second pluralities of outlets for releasing the inert gas into the molding room in a plurality of directions which cross one another, the first plurality of outlets being located at spaced locations relative to one another along the longitudinal axis of the inert gas supply conduit, the second plurality of outlets being located at spaced locations relative to one another along the longitudinal axis of the inert gas supply conduit.

9. The apparatus of claim 1, wherein the deflector moves between a position where it deflects the flow of the inert gas released by the inert gas supply conduit toward the mold set and a second position wherein the deflector does not deflect the flow of the inert gas released by the inert gas supply conduit toward the mold set.

10. The apparatus of claim 1, wherein the elongated inert gas supply conduit is stationary.

11. The apparatus of claim 10, wherein the elongated inert gas supply conduit is physically separate from the mold set.

12. The apparatus of claim 1, wherein the deflector is a first deflector and wherein the apparatus further comprising a second deflector, the first and second deflectors being located on the front and back plates of the molding room, respectively.

13. A method for manufacturing a glass optical element including heating, pressurizing, and cooling a glass material within a molding room, the method comprising:
   sequentially heating, pressurizing and cooling a glass material located in a mold set as the mold set moves along a transportation path in the molding room, the molding room having front and back plates facing one another;
   supplying an inert gas into the molding room using an elongated gas supply conduit located in the molding room and having a longitudinal axis extending parallel to the transportation path, the supply conduit having outlets for releasing the inert gas into the molding room in a plurality of directions which cross one another at different points along the transportation path; and
   deflecting at least some of the inert gas released by the outlets towards the mold set using a deflector located on at least one of the front and back plates of the molding room.

14. The method of claim 13, wherein the glass material is heated by a heating unit, pressurized by a pressurizing unit that pressurizes the glass material and cooled by a cooling unit that cools the glass material.

15. The method of claim 13, further including emitting the inert gas introduced into the molding room to a location outside of the molding room.

16. The method of claim 13, wherein the supply conduit has first and second pluralities of outlets for releasing the inert gas into the molding room in a plurality of directions which cross one another, the first plurality of outlets being located at spaced locations relative to one another along the longitudinal axis of the gas supply conduit, the second plurality of outlets being located at spaced locations relative to one another along the longitudinal axis of the gas supply conduit.

17. The method of claim 13, wherein the elongated inert gas supply conduit is stationary.

18. The method of claim 17, wherein the elongated inert gas supply conduit is physically separate from the mold set.

19. The process of claim 13, wherein the deflector is a first deflector and at least some of the inert gas released by the outlets is deflected towards the mold set by a second deflector, the first and second deflectors being located on the front and back plates of the molding room, respectively.

* * * * *